2,981,765
CATALYTIC PROCESS FOR THE PRODUCTION OF DIARYLMETHANES

Lloyd C. Fetterly, Oakland, Calif., assignor to Shell Oil Company, a corporation of Delaware No Drawing. Filed Dec. 29, 1958, Ser. No. 783,162

9 Claims. (Cl. 260—668)

This invention relates to a process for the production of diarylmethanes, and more specifically to a process for producing diarylmethanes by condensation of alkylaromatic hydrocarbons with formaldehyde in the presence of a porous, solid, acidic catalyst.

It is known to produce diarylmethanes by reaction of aromatic hydrocarbons with liquid catalysts consisting essentially of concentrated sulfuric acid. These known catalysts have the undesirable tendency of causing substantial loss of aromatic hydrocarbon feed to by-products such as sulfonates. Furthermore, these catalysts are not favorable for use with an aqueous solution of formaldehyde such as formalin, which is the most readily and economically available commercial form of formaldehyde.

It has recently been found that by use of catalysts consisting essentially of silica gel having deposited thereon no more than a monomolecular layer of strong mineral acid, the undesired side reactions are avoided so that the aromatic can be converted to diarylmethane and a minor amount of higher condensation product without any significant loss to side reaction products. Calcined silica-alumina composites can also serve as suitable bases for mineral acid in the catalysis of these reactions. These catalysts are suitable for use with formaldehyde added in the form of an aqueous solution.

It has been found that catalysts of the type described suffer loss of activity during use. Three separate mechanisms of deactivation may be involved.

A slow deactivation results from the gradual accumulation of carbonaceous deposits on the catalyst surface. This may require ultimate removal of the catalyst from the reaction zone and removal of carbonaceous matter by conventional oxidative regeneration, e.g., by burning the catalyst with a gas containing a controlled amount of free oxygen, such as air. Part or all of the mineral acid may be lost from the solid during regeneration. If that is the case the acid is readily replaced before the catalyst is returned to the reaction zone or during start-up, as described below.

A second type of deactivation involves gradual loss of mineral acid from the catalyst surface. This may be due to interaction between the acid and the reactants, e.g., a small amount of sulfonation, or to trace solubility of acid in the reaction mixture and removal in the liquid product stream.

A third type of deactivation is only found when alumina is present in the catalyst base. It results in a relatively rapid loss of mineral acid from the catalyst surface, while, however, the acid anion is retained in the solid composite. This appears to be due to gradual reaction of alumina with the acid, resulting in formation of the corresponding aluminum salt.

According to the process of this invention, one can maintain the above-described solid acidic catalysts active for prolonged periods of time without necessity of removal from the reaction zone.

It is an object of the present invention to provide an improved process for the production of condensation products of aromatic hydrocarbons and formaldehyde containing essentially only diarylmethanes and no more than a low condensation of triaryldimethanes and higher condensation products. It is a further object to prepare diarylmethanes by the reaction of formaldehyde with alkyl-substituted hydrocarbons in the presence of a solid acidic catalyst and to provide a novel method of maintaining catalyst activity. It is a further object to provide a novel catalyst for such reactions. Other objects of the present invention will appear from the following description thereof.

The present invention provides an improved method for converting alkyl-substituted aromatic hydrocarbons having at least one unsubstituted nuclear carbon atom into diarylmethanes by condensation with formaldehyde in a process suitable for commercial use. Briefly, the present invention provides a process for the production of diarylmethanes by contacting formaldehyde with a suitable aromatic hydrocarbon feed in the presence of a catalyst consisting of silica gel of high surface area or of a calcined silica-alumina composite, having deposited thereon a small amount of a strong mineral acid, preferably one which is substantially non-volatile at a temperature of 200° C., said contact taking place in a liquid-solid slurry, and maintaining the activity of the acidic catalyst by continuous or periodic addition of small amounts of said acid in liquid form. The life of the solid catalyst in a continuous process can be extended as much as four- to eightfold, at comparable conditions, by adding liquid acid according to the process of this invention.

Suitable hydrocarbon feedstocks for the present invention are alkyl-substituted monocyclic aromatic hydrocarbons containing at least one unsubstituted nuclear carbon atom. The reactivity of aromatic hydrocarbons with formaldehyde under the conditions of the present invention increases with the increasing number of alkyl substituents in the ring. Benzene is not readily converted to diphenylmethane according to the present invention. Monocyclic alkylaromatic hydrocarbons containing at least one unsubstituted nuclear carbon atom and having no more than six carbon atoms in any one alkyl group and no more than fifteen carbon atoms per molecule are preferred feedstocks. Especially preferred feedstocks are the mono- to penta-methylbenzenes. Aromatics having alkyl substituents other than methyl groups can be employed including, for example, ethylbenzene, ethyltoluenes, ethylxylenes, diethylbenzenes, cumene, isopropyltoluenes, isopropylxylenes, and the like. The aromatic feedstocks may be employed as a relatively pure fraction of a single compound or of a single molecular weight range, but mixtures of aromatic hydrocarbons may also be employed.

Formaldehyde can be employed in the present invention in aqueous or anhydrous form. It may be charged to the reaction as a liquid or vapor stream. It may also be employed in the form of paraformaldehyde.

The condensation products produced according to the present invention are suitable for use as high boiling aromatic solvents, as charge stocks to a hydrocracking step to produce methylated aromatics, or as intermediates in the production of insecticides or of wetting agents.

The diarylmethane compounds resulting from the use of toluene, mixed xylenes, pseudocumene, mesitylene and mixed tetramethylbenzenes as feed stocks are suitably hydrocracked in accordance with the method described in U.S. Reissue Patent 24,579, of L. C. Fetterly, to produce, respectively, in substantial yield, paraxylene, pseudocumene, durene, isodurene and pentamethylbenzene.

A particularly suitable catalyst for use in the present process consists of silica gel or of calcined silica-alumina of the type used as petroleum cracking catalyst, containing adsorbed thereon sulfuric or phosphoric acid in an amount ranging between 0.05 and 1.5 millimoles of $H_2SO_4$ per gram of solid. A preferred concentration of acid on the catalyst is between 0.05 and 0.25 millimole/g. solid, the range between 0.05 and 0.1 millimole/g. solid being especially suitable. The correlation between the amount of acid deposited on solid and the activity of the catalyst is illustrated in Table 1, in which the formaldehyde conversion obtainable with a fresh catalyst is shown for silica gel containing various amounts of sulfuric acid deposited thereon.

TABLE 1

| Amount of $H_2SO_4$, Millimoles per gram solid | 0 | 0.01 | 0.05 | 0.25 | 0.5 | 1.0 | 1.5 | 3.0 |
|---|---|---|---|---|---|---|---|---|
| Hydrocarbon Feed: | Formaldehyde Conversion, Percent | | | | | | | |
| Xylenes (mixed) | 5 |  | 87 | 94 | 92 | 93 | 90 |  |
| Pseudocumene |  | 30 |  | 95 | 96 | 92 |  |  |
| Toluene |  |  |  |  |  | 55 |  | 10 |

These results were obtained with the respective identified hydrocarbon feedstocks under conditions which were substantially identical for any one feedstock; the reactions were carried out in the manner described in Example I. The formaldehyde was employed in the form of 37% aqueous formalin. It is apparent that formaldehyde conversion is highest with catalysts having between 0.05 and 1 millimole $H_2SO_4$/g. solid. It was also observed, however, as illustrated in Table 2, that at concentrations in the lower part of the effective range, e.g., at 0.05 millimole/g. solid, the catalyst life, before regeneration, was substantially greater than at the higher concentrations, e.g., between 0.5 and 1.5 millimoles/g. solid. It is, therefore, preferred to operate with catalysts having an acid concentration in the lower part of the effective range.

TABLE 2

| Catalyst life, grams alkylate per gram catalyst | 2 | 6 | 10 | 12 | 14 | 16 | 20 | 25 |
|---|---|---|---|---|---|---|---|---|
| Amount of $H_2SO_4$, Millimoles/g. solid: | Formaldehyde Conversion, Percent | | | | | | | |
| 0.05 | 88 | 82 | 80 | 78 | 75 | 73 | 66 | 40 |
| 0.25 | 90 | 91 | 90 | 89 | 82 | 58 |  |  |
| 0.5 | 90 | 90 | 60 | 17 |  |  |  |  |
| 1.0 | 93 | 94 | 26 |  |  |  |  |  |
| 1.5 | 92 | 30 |  |  |  |  |  |  |

Other mineral acids, e.g., phosphoric acid, phosphotungstic, and silicotungstic acid, supported on porous silica gel or calcined silica-alumina in the same concentration range as sulfuric acid (as millimoles/g. solid) are successfully employed in catalyzing the condensation of alkylaromatic hydrocarbons with formaldehyde to form diarylmethanes.

The acid-on-solid composite used to start a run can be simply prepared by spraying dry silica gel or calcined silica-alumina with the desired amount of a liquid mineral acid or an aqueous solution of a mineral acid. It is preferred to use a relatively dilute acid solution in order to permit uniform application of the acid to the solid. When sulfuric acid is employed, a solution of 1% to 10% by weight $H_2SO_4$ is preferred, a strength of about 5% by weight being very suitable. If the amount of water added by spraying with aqueous acid does not exceed about 30% by weight, the resulting composite may be directly used in the alkylation step. If more water is employed, the composite should be dried before use, e.g., by heating at 150° C. for one hour or more. Although the resulting catalyst contains a normally liquid acid such as sulfuric acid and may also contain water, it has the feel and appearance of dry silica gel or cracking catalyst, respectively.

In accordance with this invention, a run can also be started by placing the desired amount of silica gel or calcined silica-alumina and of aromatic feed into a stirred vessel, heating the agitated mixture to reaction temperature, then adding a predetermined amount of acid in the range from 0.05 to 1.5 millimoles/g. solid, either as concentrated acid or in aqueous solution, and starting the addition of formaldehyde after the original acid addition has been completed. If aqueous acid is used, provision is made to remove water vapor liberated during the acid addition.

In order to be effective, the catalyst surface must be acidic, but not excessively so. The preferred catalysts consist of silica gel or calcined silica-alumina, having deposited thereon no more than one-half the amount equivalent to a monomolecular layer of a polybasic mineral acid which is substantially non-volatile at the reaction conditions. It is estimated that 3 millimoles of $H_2SO_4$ per gram of solid of 800 m.$^2$/g. surface area corresponds to a monomolecular layer. When an amount of normally liquid mineral acid in excess of a monomolecular layer is employed, the excess amount of acid acts like the concentrated mineral acid itself. For example, a catalyst containing an excessive amount of liquid $H_2SO_4$ shows a substantial amount of acidity having a $pK_A$ lower (more negative) than $-8$. (A $pK_A$ of $-8$ corresponds to a liquid sulfuric acid of about 90% concentration; $pK_A$ of $-9$ corresponds to 97% $H_2SO_4$.) A solid catalyst of such strong acidity is unsuitable for use in the present process. In the preferred catalysts, at least about 90% of the acid sites of the catalyst should have a $pK_A$ no lower than $-8.2$. One millimole of $H_2SO_4$ or $H_3PO_4$ per gram of solid is equal to about 10% by weight, based on solid catalyst. Also, one millimole of a mineral acid per gram solid is equal to 0.01 millimole per square meter for a solid of 100 m.$^2$/g. surface area, and to 0.00125 millimole per square meter for a solid of 800 m.$^2$/g. surface area.

In earlier work it was found that while silica gel-acid composites are very active catalysts, composites of the same or larger amounts of acid on fresh silica-alumina or on alumina per se were completely inactive. However, silica-alumina can be converted into a suitable catalyst base by calcining prior to the addition of mineral acid. It is believed that calcining results in converting the alumina in such composites into a less active form, so that it does not react immediately with added mineral acid to form the corresponding aluminum salt. By virtue of the method of maintaining catalyst activity according to this invention, it has become possible to use silica-alumina as a base for mineral acid to provide a catalyst for the conversion of alkylaromatics and formaldehyde to diarylmethanes. Such catalysts lose activity rapidly and require much greater acid addition rates than silica gel-based catalysts. Although catalysts prepared from a calcined silica-alumina base do not have as long a life as those prepared from silica gel, this may be outweighed by the much lower cost of some silica-alumina composites, compared to silica gel.

Suitable silica-alumina composites are the synthetic silica-alumina petroleum cracking catalysts, which are well known. These may be prepared by impregnation of silica with aluminum salts or by co-precipitation of silica and alumina gels or by physical mixing methods. Freshly-prepared catalyst, calcined by heating at temperatures of 600° C. or higher at times from half-one-hour to several days, is suitable. It has also been found a so-called "equilibrium catalyst" withdrawn from a fluid catalyst cracking unit operating on a synthetic silica-alumina catalyst, which has been exposed numerous times to catalyst regeneration conditions at calcining temperatures, is a suitable and very inexpensive base for mineral acid.

In a particularly suitable method of carrying out the present reaction the catalyst is employed in the form of finely-divided particles which are slurried in a liquid mass of aromatic hydrocarbon feed which, during the course of the reaction, also will include the condensation products of the reaction. In a preferred method of operation an agitated slurry comprising the catalyst particles in the liquid is maintained in a heated reaction zone at a temperature sufficiently high to permit prompt removal of water, added to and formed in the reaction zone, in the form of a vapor stream comprising the water and some of the charge hydrocarbon. Aqueous or anhydrous formaldehyde is gradually added to the reaction zone; any water which is added with the formaldehyde, together with the water formed in the reaction, is immediately removed from the reaction zone by continuously withdrawing vapors of water and aromatic. The vapors withdrawn from the reaction zone are condensed; the aromatic hydrocarbon is suitably returned to the reaction zone. If unreacted formaldehyde is removed in the vapor stream it will be contained in the water layer of the condensate; such recovered formaldehyde may also be returned to the reaction zone. The reaction can be carried out in a batch-wise manner, e.g., by placing a desired amount of the aromatic hydrocarbon in the reaction zone together with the required amount of catalyst, agitating and heating and gradually adding sufficient formaldehyde to produce the desired amount of the diarylmethane. The reaction can also be carried out continuously by maintaining a body of liquid comprising catalyst slurried in aromatic hydrocarbon charge and product in the reaction zone, adding fresh aromatic hydrocarbon charge and formaldehyde and withdrawing a bleed stream of the liquid for removal of product therefrom and return of the remainder to the reaction zone.

When operating in the above-described manner, reaction temperatures between 100° C. and 200° C. are preferred although temperatures up to 250° C. may be employed. Temperatures between 115° C. and 165° C. are most suitable. Atmospheric pressure is preferably employed although it may be desirable to employ somewhat higher pressures to permit operating at higher temperatures, particularly with a relatively low-boiling hydrocarbon such as toluene. Thus, pressures from 1 to 10 atmospheres are suitably employed while the pressure of from 1 to 3 atmospheres is generally preferred. In the above-described method of operating it is preferable to add the formaldehyde gradually and to maintain a high ratio of feed aromatic hydrocarbon to unreacted formaldehyde monomer in the reaction slurry, e.g., from 30 to 2,000 moles of aromatic per mole of formaldehyde. In a continuous reaction system the composition of the steady-state reaction mixture is controlled to maintain in the liquid no more than 60% by weight of condensation product and preferably less than 50% and desirably as low as 20% to 25%. Similarly, in a batch reaction the addition of formaldehyde is discontinued when the concentration of the condensation product in the liquid has reached 60% by weight, or earlier.

Although the above-described manner of carrying out the reaction is particularly suitable, the solid acidic catalyst may also be employed in a reaction in which the formaldehyde and aromatic hydrocarbon are added simultaneously to the reaction zone in a batch reaction.

The amount of catalyst maintained in the reaction zone in liquid-phase operation is in the range between 2 and 30 weight percent or more, and preferably between 10 and 30 weight percent of the hydrocarbon present in the reaction zone.

In accordance with this invention liquid acid or its aqueous solution is suitably added directly to the reaction mixture slurry. It may also be added in admixture with fresh aromatic feed or in admixture with formaldehyde. Acid may be added at regular intervals, e.g., every hour or half-hour. The latter rate has been found to permit maintaining essentially steady catalyst activity. Acid addition may also be continuous. A further method of acid addition comprises addition as required to prevent any substantial drop in catalyst activity as indicated by formaldehyde conversion. This is determined by monitoring the formaldehyde concentration in the aqueous layer of the reactor overhead condensate. The term "continual acid addition" comprises continuous and periodic addition.

The amount of acid added is such as will maintain an amount of acid in the above-mentioned range on the solid catalyst. With silica gel as a base, the average hourly addition rate is generally between 0.0005 and 0.01 millimole per gram of silica gel. Maximum catalyst life is obtained at addition rates from 0.001 to 0.003 millimole per gram silica gel per hour. When the solid base is a calcined silica-alumina composite, the rate of addition is much higher, e.g., between 0.05 and 0.1 millimole per gram of solid per hour. Sufficiency of the addition rate can be tested periodically by withdrawing a sample of catalyst and titrating it to determine its acid content. As a practical matter it is generally preferred to observe the activity of the catalyst by following the extent of aldehyde conversion, e.g., by analyzing the formaldehyde content of the reactor overhead condensate water layer, and to add liquid acid to maintain the desired activity.

The volume of liquid acid added to maintain catalyst activity is very small compared to the amounts of liquid reactants and is not sufficient to catalyze a substantial amount of reaction except by being adsorbed on the surface of the solid catalyst present in the reactor. There is no substantial amount of liquid acid phase present in the reaction slurry at any time.

In numerous runs carried out in accordance with the present invention it has been found that the amount of aromatic hydrocarbon feed reacted was substantially entirely converted to condensation product with formaldehyde, i.e., to the extent of 98% or better. With minor exceptions, the condensation obtained consisted of at least 85% and generally between 90% and 100% of the diarylmethanes, the remainder being mainly triaryldimethanes and sometimes small amounts of the tetraaryltrimethanes or higher compounds. Substantially no resins were produced in the reaction according to the present method.

The present invention will be further described by means of the following illustrative examples, which are not to be considered as limitative of the invention but merely are presented to illustrate some aspects thereof.

EXAMPLE I

A number of runs were carried out employing catalysts comprising silica gel of high surface area and from 0.1 to 1.0 millimole of sulfuric acid per gram solid (from 1% to 10% by weight) and employing different methylbenzene hydrocarbons from toluene through tetramethylbenzenes. The runs were carried out by placing into a reaction vessel a desired amount of the aromatic hydrocarbon and of the finely-divided catalyst, heating the mass in the reaction vessel and stirring it to produce a slurry, and then gradually adding aqueous formalin (37% aqueous formaldehyde) while maintaining an elevated temperature sufficient to cause vapor of water and aromatic hydrocarbon to be continually withdrawn from the reaction zone through a reflux condenser which returned the hydrocarbon to the reaction zone and permitted the water to be removed. The operating conditions and results of these runs are given in Table 3. Component analyses of mixed hydrocarbon feeds employed in some of these runs are shown in Table 4.

TABLE 3

| Run No. | Catalyst, percent weight of $H_2SO_4$ based on solid | Feed Aromatic | Boiling Point or Range, °C. | Ultimate Molar Ratio | Reaction Temperature, °C. | Time for Formalin Addition, min. | Volume Ratio Aromatics: Catalyst | Conversion of Formaldehyde percent | Condensation Product |||
|---|---|---|---|---|---|---|---|---|---|---|---|
| | | | | | | | | | Diarylmethane, percent | Triaryldimethane, percent | Heavier (as Tetraaryltrimethane), percent |
| 1 | 10 | Toluene | 110.6 | 7.1/1 | 99-103 | 30 | 5/1 | 63 | | | |
| 2 | 10 | Paraxylene | 138.4 | 4.0/1 | 134-136 | 87 | 5/1 | 63 | 67 | 19 | 14 |
| 3 | 10 | Xylenes a | 136.2-144 | 6.1/1 | 132-137 | 84 | 10/1 | 94 | | | |
| 4 | 5 | Xylenes a | 136.2-144 | 6.1/1 | 133-138 | 55 | 5/1 | 90 | 100 | 0 | 0 |
| 5 | 10 | Trimethylbenzenes.a | 162-176.5 | 5.5/1 | 150-160 | 34 | 5/1 | 92 | | | |
| 6 | 1 | Trimethylbenzenes.a | 162-176.5 | 5.4/1 | 160-164 | 35 | 10/1 | 76 | 97 | b 3 | |
| 7 | 10 | Mesitylene (99%) | 164.6 | 2.7/1 | 150-158 | 105 | 6/1 | 78 | 89 | b 11 | |
| 8 | 10 | Durene (>95%) | 193-5 | 4.7/1 | 155-160 | 59 | ca. 5/1 | 96 | | | |
| 9 | 10 | Prehnitene (>90%) | 204 | 1.9/1 | 148-160 | 103 | 5/1 | 89 | | | |
| 10 | 10 | Tetramethylbenzenes.a | 193-204 | 3.3/1 | 155-158 | 162 | 5.5/1 | 93 | | | | a Details in Table 4.
b Total heavier than diarylmethane, calculated as triaryldimethane.

TABLE 4

*Aromatic feed compositions (percent)*

| Run No | 3, 4 | 5 | 6 | 10 |
|---|---|---|---|---|
| Aromatic: | | | | |
| Ethylbenzene | 4 | | | |
| Orthoxylene (1,2-dimethylbenzene) | 5 | | | |
| Metaxylene (1,3-dimethylbenzene) | 63 | | | |
| Paraxylene (1,4-dimethylbenzene) | 28 | | | |
| Hemimellitene (1,2,3-trimethylbenzene) | | <3 | | |
| Pseudocumene (1,3,4-trimethylbenzene) | | 79 | | |
| Mesitylene (1,3,5-trimethylbenzene) | | <18 | 83 | |
| Orthoethyltoluene (1-ethyl-2-methylbenzene) | | 3 | | |
| Prehnitene (1,2,3,4-tetramethylbenzene) | | | | 34 |
| Isodurene (1,2,3,5-tetramethylbenzene) | | | | 42 |
| Durene (1,2,4,5-tetramethylbenzene) | | | | 24 |

The data in Table 3 illustrate the effectiveness of these catalysts in catalyzing the condensation of a variety of aromatic hydrocarbons and formaldehyde. Other conditions being equal, the conversion of formaldehyde is a measure of the reactivity of the hydrocarbon and of the catalyst since the unconverted formaldehyde is mainly that which is withdrawn from the reaction zone together with the vapor stream. When the catalyst is effective and the aromatic hydrocarbon is reactive, the formaldehyde reacts quickly so that little or none is lost in the vapor stream, whereas with less active catalyst or aromatic hydrocarbon more formaldehyde is withdrawn and the conversion is low. Since runs 5 and 8, for example, show that 1 millimole of sulfuric acid per gram solid is a highly effective catalyst, the low formaldehyde conversion in runs 1 and 2 are attributed to the relatively lower reactivity of the toluene and paraxylene feed. The relatively low conversion in run 7 with mesitylene is explained by the higher ultimate molar ratio of aromatic to aldehyde, which permitted a greater amount of aldehyde to be lost in the vapor stream.

EXAMPLE II

Although sulfuric acid is the preferred mineral acid for use on a porous support in the present invention, other mineral acids supported on a porous carrier are suitably employed. For example, under otherwise identical conditions similar to Example I, toluene and 37% aqueous formalin were reacted in the presence of a catalyst consisting in one case of 10 weight percent sulfuric acid on solid support and in the other case of 10 weight percent phosphotungstic acid on identical support. Aldehyde conversions obtained were 55% and 58%, respectively, thus demonstrating substantially identical activity in these catalysts. Example VI illustrates similar activity for phosphoric acid.

EXAMPLE III

In a run carried out in the same manner as run 1 of Example I, a catalyst was employed which consisted of 1 millimole of sulfuric acid per gram of support on a base which was a fresh, i.e., uncalcined, commercial cracking catalyst of the aluminum silicate type, containing 12% $Al_2O_3$ and 88% $SiO_2$ and having a surface area of about 600 sq. m./g. In this run, essentially no aldehyde conversion was obtained.

In a similar run in which a commercial activated alumina was used as base for 0.1 millimole of sulfuric acid per gram of support, no aldehyde conversion was observed.

EXAMPLE IV

Run 11, a continuous run according to the process of this invention, was carried out as follows: A stirred reactor autoclave was filled with a xylene fraction containing 94.4% by weight metaxylene and 10.4% by weight of a 28-200 mesh fraction of a silica gel which had a pore volume of 0.406 m.$^2$/g. and specific surface of 816 square meters per gram. The mixture was agitated and heated to about 135° C. 0.025% by weight of $H_2SO_4$, based on the silica gel, was added over a period of about ten minutes by slowly dropping concentrated sulfuric acid into the stirred mass. Water vapor, liberated during this addition, was withdrawn from the autoclave. After ebullition had ceased, the addition of formalin was started. It entered the autoclave near the bottom. Vapors were continuously withdrawn, condensed, and aromatic returned to the reactor. A liquid bleed stream of the total reaction liquid was withdrawn through a filter. Fresh xylene was added to maintain the liquid level in the reactor. Concentrated sulfuric acid was added periodically at the average rate of 0.019% by weight (based on solids) per hour to maintain catalyst activity. The initial formaldehyde conversion was 82.6%. Average formaldehyde conversion, during a run of about 30 hours, was about 73%. Meta-xylene conversion was about 9.4%, and the production of dixylylmethane was about 64 lb. per lb. of solid.

EXAMPLE V

In a series of studies of catalyst life, carried out in a continuous system similar to Example IV, but with higher solids concentration, runs 12-14 were made using the following materials as support for sulfuric acid, in the conversion of m-xylene and formaldehyde:

| Run No. | Type of Solid | Pore Volume, cc./g. | Specific Surface, m²./g. |
|---|---|---|---|
| 12 | "MSA-3" Microspheriodal synthetic cracking catalyst (75% SiO₂, 25% Al₂O₃ equilibrium catalyst, removed from a commercial catalytic cracking unit. Contained 0.91% wt. carbon and 0.03% wt. sulfur). | 0.377 | 122 |
| 13 | Synthetic high-alumina cracking catalyst (75% SiO₂, 25% Al₂O₃). Calcined. | 0.715 | 391 |
| 14 | Synthetic high-alumina cracking catalyst (75% SiO₂, 25% Al₂O₃). Fresh, uncalcined. | 0.686 | 353 |

Run 12, using "equilibrium catalyst" as support, was continued for 23 hours and resulted in the production of 22 lb. dixylylmethane per lb. of catalyst at an average formaldehyde conversion of 39.3%. The maximum formaldehyde conversion observed in this run was 54.8%.

Run 13, using calcined fresh high-alumina cracking catalyst was run for five hours and resulted in the production of 14.7 lb. of dixylylmethane per lb. of catalyst, at an average formaldehyde conversion of 37.4%.

Run 14, using uncalcined fresh high-alumina cracking catalyst was discontinued after 2.5 hours. The formaldehyde conversion was less than 20%.

EXAMPLE VI

It was found that phosphoric acid can be more active than sulfuric acid in the process of this invention. Two runs were carried out at essentially identical conditions, in accordance with Example IV. The solids concentration in the slurry was, in each case, about 3% by weight. In run 15, 0.25% by weight H₂SO₄, based on solid, was added initially and in run 16, 0.27% by weight of H₃PO₄. The acid addition rate during the remainder of each run was about 0.015% by weight per hour, based on solids. The maximum formaldehyde conversion in run 15 was 71.2%; in run 16 it was 85.6%. Average formaldehyde conversions were 55.6% and 71%, respectively, and metaxylene conversions were 13.3% and 16.2%, respectively.

I claim as my invention:

1. A process for the production of diarylmethanes by reaction of alkyl-substituted aromatic hydrocarbons having at least one unsubstituted nuclear carbon atom and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of a strong mineral acid and calcined silica-alumina containing an active amount of a strong mineral acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

2. A process for the production of diarylmethanes by reaction of alkyl-substituted aromatic hydrocarbons having at least one unsubstituted nuclear carbon atom and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being silica gel containing an active amount of a strong mineral acid, and maintaining the activity of said catalyst by adding to said slurry further portions of said acid at the rate of from 0.0005 to 0.01 millimole per gram of said silica gel per hour.

3. A process for the production of diarylmethanes by reaction of alkyl-substituted aromatic hydrocarbons having at least one unsubstituted nuclear carbon atom and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of sulfuric acid and calcined silica-alumina containing an active amount of sulfuric acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

4. A process for the production of diarylmethanes by reaction of alkyl-substituted aromatic hydrocarbons having at least one unsubstituted nuclear carbon atom and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of phosphoric acid and calcined silica-alumina containing an active amount of phosphoric acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

5. A process for the production of diarylmethanes by reaction of alkyl-substituted aromatic hydrocarbons having at least one unsubstituted nuclear carbon atom and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being calcined silica-alumina containing an active amount of a strong mineral acid, and maintaining the activity of said catalyst by adding to said slurry further portions of said acid at the rate of at least 0.05 millimole per gram of said calcined silica-alumina per hour.

6. A process for the production of ditolylmethane by reaction of toluene and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of a strong mineral acid and calcined silica-alumina containing an active amount of a strong mineral acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

7. A process for the production of dixylylmethanes by reaction of xylenes and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of a strong mineral acid and calcined silica-alumina containing an active amount of a strong mineral acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

8. A process for the production of di(trimethylphenyl)methane by reaction of trimethylbenzenes and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of a strong mineral acid and calcined silica-alumina containing an active amount of a strong mineral acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

9. A process for the production of dixylylmethanes and di(trimethylphenyl)methanes by reaction of a mixture of at least one xylene and at least one trimethylbenzene and formaldehyde which comprises adding formaldehyde to a liquid slurry of a solid composite catalyst in a liquid comprising essentially aromatic feed and product and maintained at a temperature at which water evaporates from said slurry, the concentration of said solid in said slurry being in the range of from 2 to 30% by weight and said solid composite catalyst being selected from the group consisting of silica gel containing an active amount of a strong mineral acid and calcined silica-alumina containing an active amount of a strong mineral acid, and maintaining the activity of said catalyst by adding to said slurry further portions of said acid at the rate of from 0.0005 to 0.01 millimole per gram of said silica gel per hour when the solid is silica gel and at the rate of at least 0.05 millimole per gram of said calcined silica-alumina per hour when the solid is silica-alumina.

References Cited in the file of this patent

UNITED STATES PATENTS

| | | |
|---|---|---|
| 2,765,218 | Amir | Oct. 2, 1956 |
| 2,850,545 | Fetterly et al. | Sept. 2, 1958 |
| 2,854,493 | Fetterly et al. | Sept. 30, 1958 |